US010332411B2

(12) United States Patent
Sukkarieh

(10) Patent No.: US 10,332,411 B2
(45) Date of Patent: Jun. 25, 2019

(54) COMPUTER-IMPLEMENTED SYSTEMS AND METHODS FOR PREDICTING PERFORMANCE OF AUTOMATED SCORING

(71) Applicant: Educational Testing Service, Princeton, NJ (US)

(72) Inventor: Jana Sukkarieh, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 1204 days.

(21) Appl. No.: 13/672,766

(22) Filed: Nov. 9, 2012

(65) Prior Publication Data

US 2013/0122482 A1 May 16, 2013

Related U.S. Application Data

(60) Provisional application No. 61/558,741, filed on Nov. 11, 2011, provisional application No. 61/635,361, filed on Apr. 19, 2012.

(51) Int. Cl.
*G09B 7/02* (2006.01)
(52) U.S. Cl.
CPC ..................... *G09B 7/02* (2013.01)
(58) Field of Classification Search
CPC ........................................................ G09B 7/02
USPC ......................................................... 434/353
See application file for complete search history.

(56) References Cited

U.S. PATENT DOCUMENTS 6,431,875 B1* 8/2002 Elliott et al. ................... 434/322
2003/0224340 A1* 12/2003 Housman et al. ............ 434/353

OTHER PUBLICATIONS

Callear, David, Jerrams-Smith, Jenny, Soh, Victor; CAA of Short Non-MCQ Answers; Proceedings of the 5th International Computer Assisted Assessment Conference; 2001.
De Martino, Benedetto, Kumaran, Dharshan, Seymour, Ben, Dolan, Raymond; Frames, Biases, and Rational Decision-Making in the Human Brain; Science, 313(5787; pp. 684-687; 2006.
Flor, Michael; Profiling Syntactic Complexity of K-12 Academic Text; Educational Testing Service internal project report; Jan. 2009.
Graesser, Arthur, Chipman, Patrick, Haynes, Brian, Olney, Andrew; AutoTutor: An Intelligent Tutoring System with Mixed-Initiative Dialogue; IEEE Transactions in Education, 48(4); pp. 612-618; 2005.
Iyengar, Sheena; The Art of Choosing; Hachette Book Group; 2010.
Kahneman, Daniel, Tversky, Amos; The Psychology of Preferences; Scientific American, 246(1); pp. 160-173; 1982.

(Continued)

*Primary Examiner* — Eddy Saint-Vil
(74) *Attorney, Agent, or Firm* — Jones Day

(57) ABSTRACT

Systems and methods are provided for selecting a proposed test item for inclusion in an examination where a non-multiple choice response to the proposed test item will be automatically scored. A proposed test item is analyzed to generate a proposed test item metric, where the proposed test item is a non-multiple choice test item. The proposed test item metric is provided to a proposed test item scoring model, where the proposed test item scoring model outputs a likelihood score indicative of a likelihood that automated scoring of a response to the proposed test item would be at or above a quality level. The proposed test item is selected for inclusion in the examination based on the likelihood score.

20 Claims, 9 Drawing Sheets

(56) References Cited

OTHER PUBLICATIONS

Mitchell, Tom, Russell, Terry, Broomhead, Peter, Aldridge, Nicola; Towards Robust Computerised Marking of Free-Text Responses; Proceedings of the 6th International Computer Assisted Assessment Conference; pp. 233-249; 2002.
Mitchell, Tom, Aldridge, Nicola, Broomhead, Peter; Computerized Marking of Short-Answer Free-Text Responses; 29th Annual Conference of the International Association for Educational Assessment (IAEA); 2003.
Mohler, Michael, Mihalcea, Rada; Text-to-text Semantic Similarity for Automatic Short Answer Grading; Proceedings of the European Chapter of the Association for Computational Linguistics; 2009.
Mohler, Michael, Bunescu, Razvan, Mihalcea, Rada; Learning to Grade Short Answer Questions Using Semantic Similarity Measures and Dependency Graph Alignments; Proceedings of the Association for Computational Linguistics; 2011.
Nelson, Jessica, Perfetti, Charles, Liben, David, Liben, Meredith; Measures of Text Difficulty: Testing Their Predictive Value for Grade Levels and Student Performance; Student Achievement Partners; 2011.
Perez-Marin, Diana; Automatic Evaluation of Users' Short Essays by Using Statistical and Shallow Natural Language Processing Techniques; Master's Thesis, Universidad Autonoma de Madrid; 2004.
Quinlan, J.R.; Learning with Continuous Classes; Proceedings on Artificial Intelligence; pp. 343-348; 1992.
Rose, Carolyn, Roque, Antonio, Bhembe, Dumisizwe, Vanlehn, Kurt; A Hybrid Text Classification Approach for Analysis of Student Essays; Building Educational Applications Using Natural Language Processing; pp. 68-75; 2003.
Sheehan, Kathleen, O'Reilly, Tenaha; The CBAL Reading Assessment: An Approach for Balancing Measurement and Learning Goals; Educational Testing Service, Research Report RR-11-21; 2011.
Sukkarieh, Jana, Blackmore, John; c-rater: Automatic Content Scoring for Short Constructed Responses; Proceedings of the 22nd Florida Artificial Intelligence Research Society (FLAIRS) Conference; pp. 290-295; 2009.
Sukkarieh, Jana, Pulman, Stephen; Raikes, Nicholas; Auto-Marking: Using Computational Linguistics to Score Short, Free Text Responses; Proceedings of the International Association of Educational Assessment; 2003.
Sukkarieh, Jana, Stoyanchev, Svetlana; Automating Model Building in c-rater; Proceedings of the 2009 Workshop on Applied Textual Inference, ACL-IJCNLP; pp. 61-69; 2009.
Sukkarieh, Jana; Mind Your Language! Controlled Language for Inference Purposes; Computational Linguistics Group, Clarendon Institute, University of Oxford; 2003.
Sukkarieh, Jana; Using a MaxEnt Classifier for the Automatic Content Scoring of Free-Text Responses; Proceedings of the 30th International Workshop on Bayesian Inference and Maximum Entropy Methods in Science and Engineering; pp. 41-48; 2010.
Vanderwende, Lucy, Coughlin, Deborah, Dolan, Bill; What Syntax Can Contribute in Entailment Task; Springer-Verlag; 2006.
Wang, Yong, Witten, Ian; Induction of Model Trees for Predicting Continuous Classes; 9th European Conference on Machine Learning; 1997.

\* cited by examiner

COMPUTER-IMPLEMENTED SYSTEMS AND METHODS FOR PREDICTING PERFORMANCE OF AUTOMATED SCORING

CROSS-REFERENCE TO RELATED APPLICATIONS

This application claims the benefit of U.S. Provisional Patent Application Nos. 61/558,741 filed on Nov. 11, 2011, and 61/635,361 filed on Apr. 19, 2012, the entire contents of both of which are incorporated herein by reference.

TECHNICAL FIELD

This document relates generally to automated scoring and more particularly to predicting effectiveness of automated scoring of non-multiple choice responses.

BACKGROUND

Continued progress in natural language processing and interest in test questions requiring free-text, non-multiple choice responses has pushed research into development of automatic scoring technologies. Improvements to automatic scoring technologies are developed on a continual basis. Despite these developments, automatic scoring technology is not perfect and is often not as good as one or two human scorers are at providing a score for a response.

SUMMARY

In accordance with the teachings herein, systems and methods are provided for selecting a proposed test item for inclusion in an examination where a non-multiple choice response to the proposed test item will be automatically scored. A proposed test item is analyzed to generate a proposed test item metric, where the proposed test item is a non-multiple choice test item. The proposed test item metric is provided to a proposed test item scoring model, where the proposed test item scoring model outputs a likelihood score indicative of a likelihood that automated scoring of a response to the proposed test item would be at or above a quality level. The proposed test item is selected for inclusion in the examination based on the likelihood score.

As another example, a computer-implemented system for selecting a proposed test item for inclusion in an examination, where a non-multiple choice response to the proposed test item will be automatically scored, includes one or more data processors and one or more computer-readable mediums. The one or more computer-readable mediums include a proposed test item, where the proposed test is a non-multiple-choice test item. The one or more computer-readable mediums further include instructions for commanding the one or more data processors to analyze the proposed test item to generate a proposed test item metric, use a proposed test item scoring model to determine a likelihood score indicative of a likelihood that automated scoring of a response to the proposed test item would be at or above a quality level, and select the proposed test item for inclusion in the examination based on the likelihood score.

DETAILED DESCRIPTION

Figure 1:
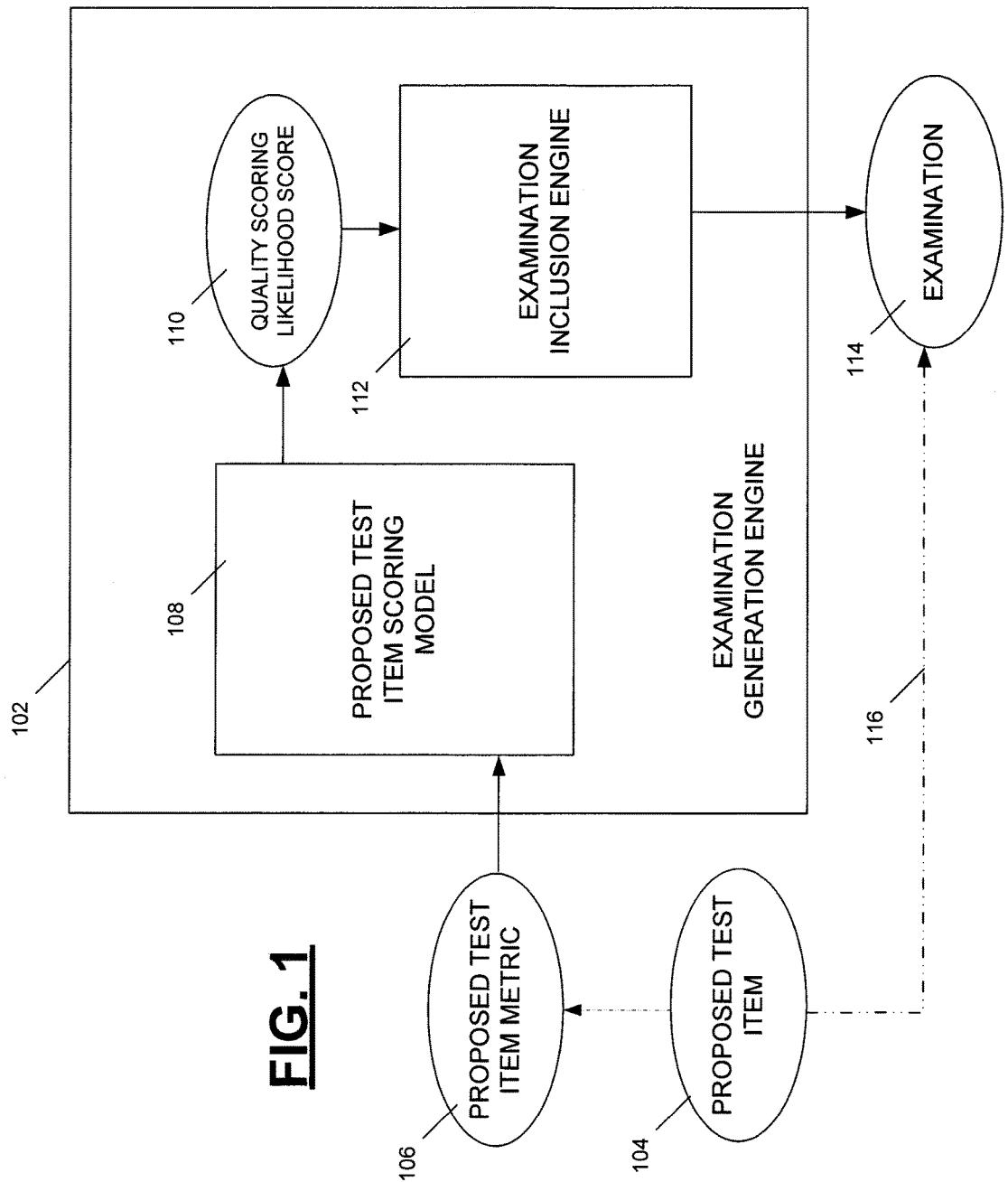
FIG. 1 is a block diagram depicting a computer-implemented examination generation engine.

FIG. 1 is a block diagram depicting a computer-implemented examination generation engine. Despite recent advances, automated scoring technologies are often lacking in the ability to score constructed responses (e.g., free-form, non-multiple choice responses such as essays or show-your-work math responses) as well as a human performing such scoring. Such deficiencies can arise from a number of causes, such as underdeveloped semantic engines, misspellings in the constructed responses, or otherwise unexpected errors in the constructed responses.

While automated scoring is not perfect, such automated scoring does perform well in certain situations. However, waiting until the time of scoring an examination to determine whether scoring will be successful is sub-optimal. An examination generation engine 102, as depicted in FIG. 1, is configured to analyze a proposed test item to determine whether automated scoring of responses to that proposed test item are likely to be of sufficient quality to be useful to the examination administrator. By pre-analyzing the proposed test questions, an examination generation engine 102 is capable of selecting proposed test questions that are likely to be scored well using automated scoring technology, allowing an examination administrator to take advantage of speed and cost advantages of automated scoring over human scoring while having confidence that scoring models will score the selected tests questions at a high level of quality.

An examination generation engine 102 is configured to receive a proposed test item 104 and a proposed test item metric 106. The proposed test item 104 is a non-multiple choice, non-true-false test item. The proposed test item 104 requests that a test taker provide a constructed response based on a prompt of the proposed test item 104. The constructed response will then be scored using automated scoring during or after the examination. The proposed test item metric 106 may be extracted by the examination generation engine 102, such as based on certain characteristics of the proposed test item 104, or the proposed test item metric 106 may be transmitted to the examination generation engine 102 by an entity external to the examination generation engine 102.

The proposed test item metric 106 is provided to a proposed test item scoring model 108 that generates a quality scoring likelihood score 110 that is indicative of a likelihood that automated scoring of a response to the proposed test item 104 would be at or above a quality level. For example, the quality scoring likelihood score 110 may indicate a likelihood that automated scoring of the response to the proposed test item 104 would be comparable to scoring of the response to the response to the proposed test item 104 using a traditional scoring method, such as multiple-human scoring of the response, where multiple humans score the response independently and a score is assigned based on the independently assigned scores. The quality scoring likelihood score 110 is provided to an examination inclusion engine 112. The examination inclusion engine 112 selects or declines to select the proposed test item 104 for inclusion in the examination 114 based on the likelihood score 110. For example, if a quality scoring likelihood score 110 for the proposed test item 104 meets or surpasses a threshold, then the proposed test item is included in the examination 114, as indicated at 116.

When the examination 114 is static across multiple test takers, then the examination 114 may comprise a list of proposed test items to be included. When the examination is to be dynamically generated, as is implemented in certain computer-based testing, the selected proposed test item may be included in a test item bank to be provided to certain test takers during examination.

The proposed test item scoring model 108 may take a variety of forms. The proposed test item scoring model may be a regression model, a decision tree model, or other type of predictive model. The proposed test item scoring model 108 may be trained based on analysis (e.g., regression analysis) on a number of training proposed test items and comparisons of human scoring of responses to those training items and automated scoring of the same training responses to those training responses. When the automated scoring of the training responses for a training item provides similar scores as human scoring of the training responses (e.g., within 1 point on a scale of 1-6, within 2 points on a scale of 1-10), then the quality of the automated scoring for that training item is considered satisfactory. When the automated scoring of the training responses is significantly different than the human scoring, then the automated scoring for that training item is considered unsatisfactory. Training item metrics are extracted based on the training proposed test items. In one example, a regression analysis is performed to determine a relationship between the training item metrics and an indicator of the satisfactory/unsatisfactory nature of automated scoring of that training item. The training item metrics are weighted accordingly after analysis of a number of training items to generate the proposed test item scoring model 108 that can predict a likelihood that responses to a proposed test item 104 will be scored at or above a quality level by an automated scoring model.

The proposed test item metric 106 may take a variety of forms and may be based on a variety of characteristics associated with the proposed test item 104. In one example, the proposed test item metric 106 is based on a characteristic of the proposed test item 104 itself. In that example, the proposed test item metric 106 includes one or more of a maximum score attainable for the proposed test item 104 or a number of concepts that an automated scoring engine is to compare a response to determine a score for the response. In another example, the proposed test item metric 106 is based on a difficulty associated with the proposed test item 106. The proposed test item metric 106 can also be based on an identification of cognitive skills that a test taker is expected to use to successfully answer the proposed test item 104. In a further example, the proposed test item metric 106 is based off of a key that is provided to score responses to the proposed test item 104. For example, constructed responses are often scored with the aid of a key that lists a number of concepts that a scorer attempts to identify in a constructed response being scored. The key also often notes a number of points that should be added when a concept is identified or subtracted when the concept is not found. In one example, the proposed test item metric 106 is based on one or more linguistic characteristics of the concepts or templates given in the scoring guideline, such as an average word frequency, a content word count (e.g., nouns, verbs, adjectives, and adverbs), an average content word frequency (e.g., an average number of times a content word is repeated in one or more responses), a syntactic constituent maximal depth in a parse tree, a maximal separation of arguments and predicates, a dependent clause count, and a maximal level of embedding of dependent clauses.

Figure 2:
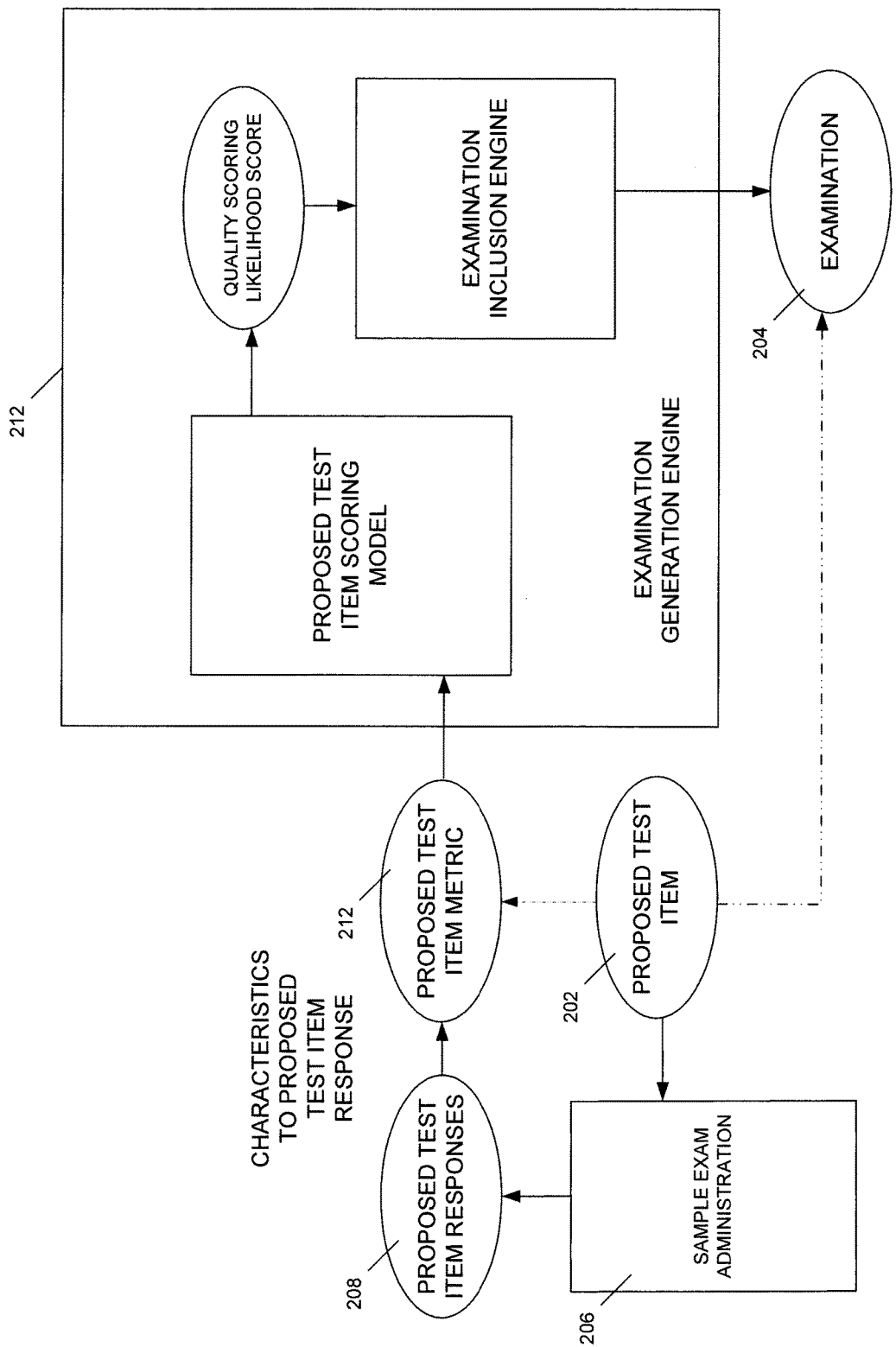
FIG. 2 is a block diagram depicting an examination generation engine that selects proposed test items for inclusion in an examination based on characteristics of a set of pre-test responses to the proposed test items.

FIG. 2 is a block diagram depicting an examination generation engine that selects proposed test items for inclusion in an examination based on characteristics of a set of pre-test responses to the proposed test items. As part of a process of determining whether a proposed test item 202 should be included on an examination 204 based on an ability to automatically score responses to the proposed test item 202 at a sufficient level of quality, the proposed test item 202 may be provided to a plurality of pre-test takers as part of a sample exam administration 206. During the pre-test the proposed test item 202 may be provided to the pre-test takers in an environment similar to the environment present during actual test taking. The pre-test takers read the prompt for the proposed test item 202 and generate constructed proposed test item responses 208 based on the information requested by the prompt. The proposed test item 202 may be responded to by a number of pre-testers as part of the sample exam administration 206. The proposed test item metric 210 is then extracted by the examination generation engine 212 or other entity based on one or more characteristics of the proposed test item responses 208. In one example the proposed test item metric 210 is based on one or more of a word count, an average word frequency, a content word count (e.g., nouns, verbs, adjectives, and adverbs), an average content word frequency (e.g., an average number of times a content word is repeated in one or more responses 208), a syntactic constituent maximal depth in a parse tree, a maximal separation of arguments and predicates, a dependent clause count, and a maximal level of embedding of dependent clauses.

Figure 3:
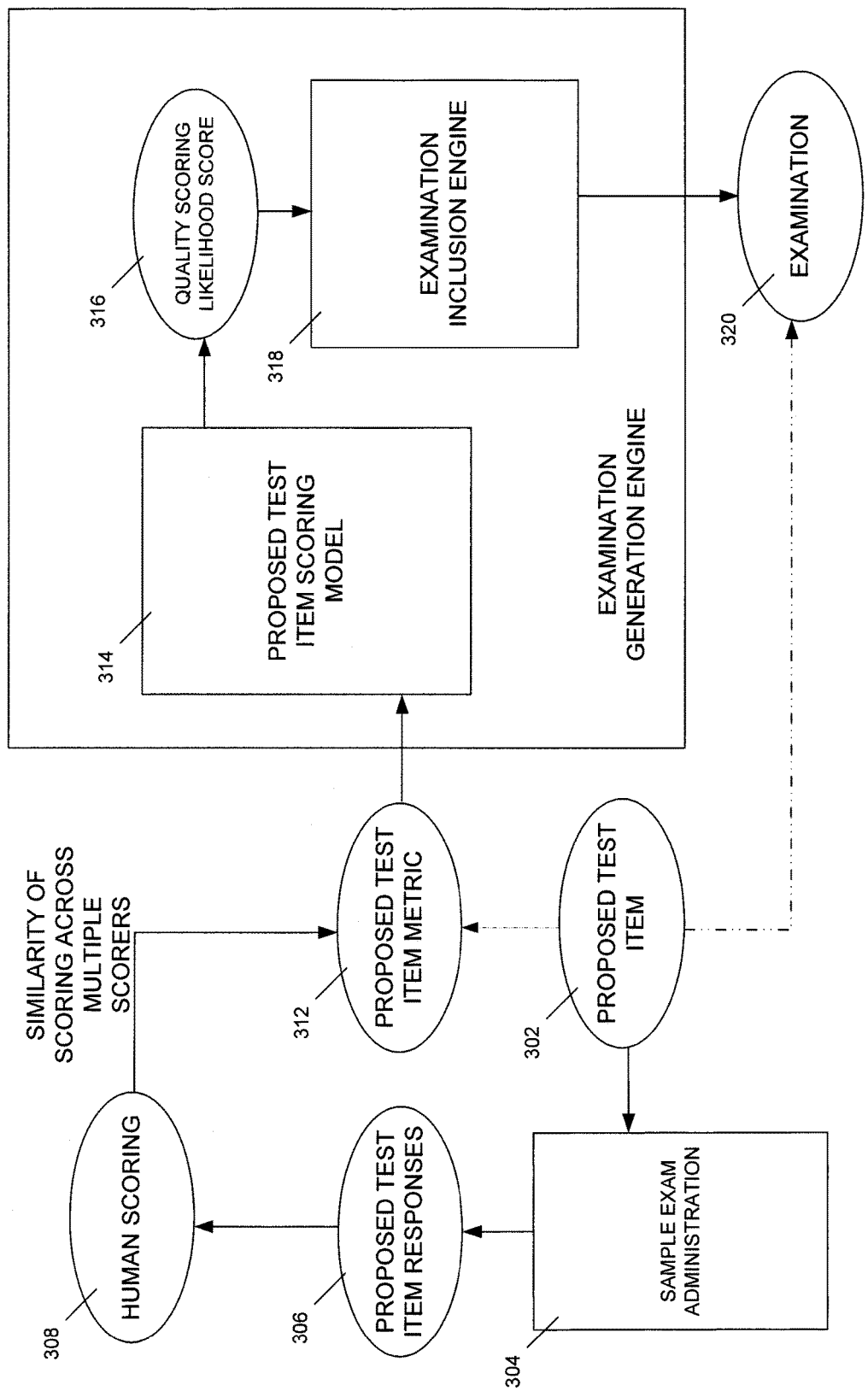
FIG. 3 is a block diagram depicting an examination generation engine that selects a proposed test item for inclusion in an examination based on a human scoring based proposed test item metric.

In addition to being based on characteristics of proposed test item responses, proposed test item metrics can be based on characteristics of human scoring of proposed test item responses. FIG. 3 is a block diagram depicting an examination generation engine that selects a proposed test item for inclusion in an examination based on a human scoring based proposed test item metric. A proposed test item 302 is developed and is provided to a number of pre-test takers in a sample exam administration 304 to generate a number of proposed test item responses 306. Those proposed test item responses 306 are provided to two or more human scorers at 308 for scoring. Scores are provided by each of the human scorers for a response to the proposed test item 302. The differences among the scores provided by the human scorers are noted (e.g., a magnitude of the total distances between the scores). Such differences are noted for each of the proposed test item responses 306 to the proposed test item 302. The proposed test item metric 312 is determined based on the noted differences, such as based on the average differences, the variances in the noted differences, or other characteristic of the noted differences. The proposed test item metric 312 is provided to the proposed test item scoring model 314 to generate a quality scoring likelihood score 316 that is used by an examination inclusion engine 318 to determine whether the proposed test item 302 should be included on the examination 320.

Agreement or differences between the scores provided by the human scorers may be measured in a variety of ways, such as at a score level or a concept level. When measuring differences at a score level, a total score provided for the proposed test item response 306 by a first human scorer is compared to a total score provided by a second scorer. When measuring differences at a concept level, agreement is measured by comparing which key concepts associated with the proposed test item 302 were found in the proposed test item response 306 by the first scorer and the second scorer at 308.

In one example, the proposed test item metric 312 is a human scoring agreement metric that is based on a level of agreement between two human scorers scoring an identical response to the proposed test item 302. A plurality of proposed test item responses 306 are provided to a first human scorer for generation of a plurality of first scores. The plurality of test item responses 306 to the proposed test item 302 are provided to a second human scorer for generation of a plurality of second scores. Magnitudes of differences between corresponding first scores and second scores are computed, and the human scoring agreement metric is determined based on the computed magnitudes of differences. In one experiment, smaller magnitude differences between human scorer scores generally identified proposed test items 302 that were automatically scored at a satisfactory level of quality.

Figure 4:
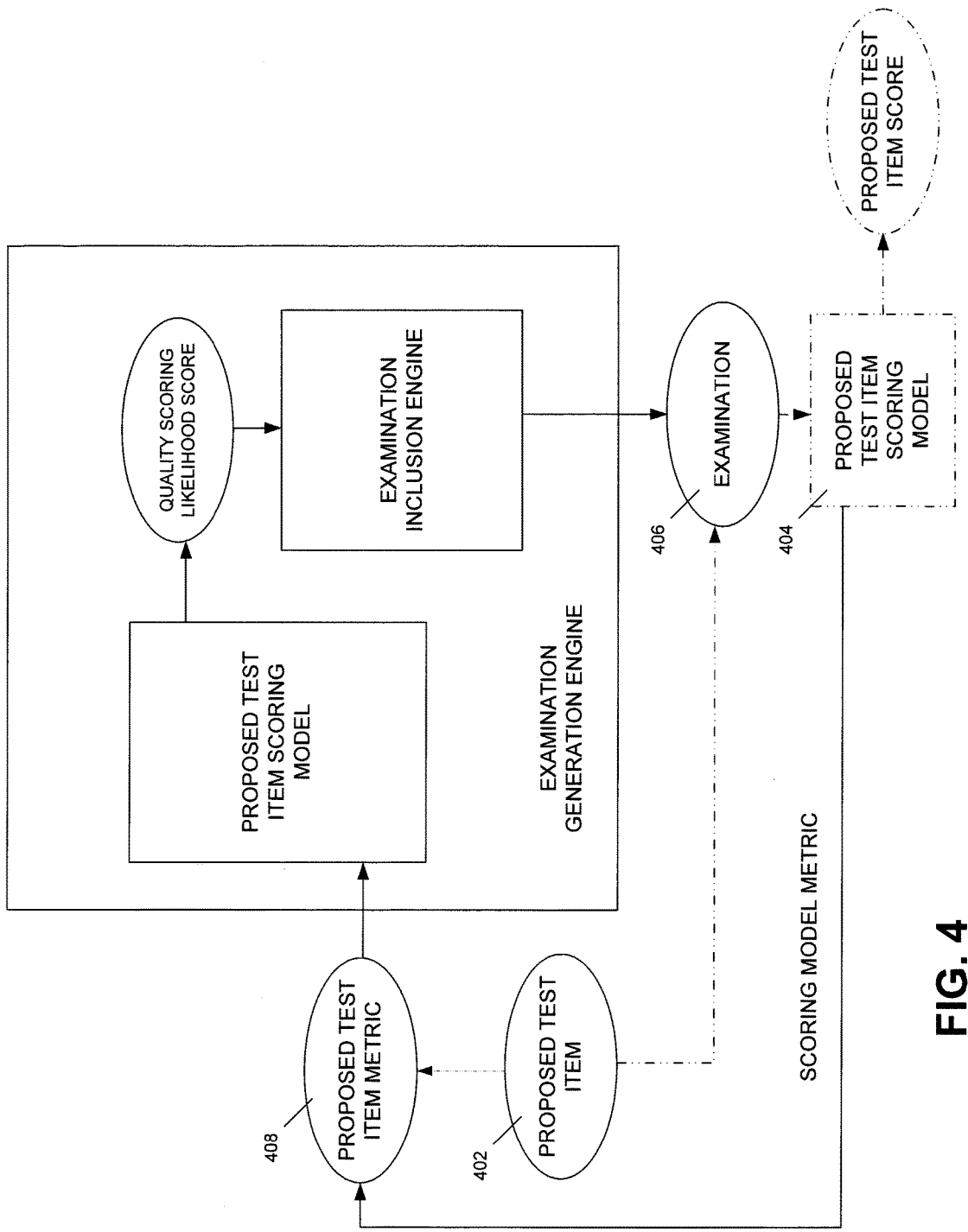
FIG. 4 is a block diagram depicting an examination generation engine that determines whether a proposed test item is to be included in an examination based on one or more characteristics of an automated scoring model for the proposed test item.

A proposed test item metric may also be based on characteristics of a proposed test item automatic scoring model that is configured to score a particular proposed test item. FIG. 4 is a block diagram depicting an examination generation engine that determines whether a proposed test item is to be included in an examination based on one or more characteristics of an automated scoring model for the proposed test item. When generating a proposed test item 402 that is anticipated to be scored by an automated scoring model 404, the scoring model itself or characteristics of the scoring model 404 may be determined prior to determining whether the proposed test item 402 should be included in an examination 406. The proposed test item metric 408 can be based on these characteristics. In one example, the proposed test item scoring model 404 is trained using a number of human pre-scored responses. A hold out sample of additional pre-scored responses can be used to test performance of the trained proposed test item scoring model 404. In such an example, the proposed test item metric 408 may be based on a number of those training responses that were or are to be used to train and test the proposed test item scoring model 404. In another example, the proposed test item metric 408 is based on one or more of a number of training responses used to train the automated scoring model, a number of training responses used to test the automated scoring model, and a number of training responses used to validate the training model.

Figure 5:
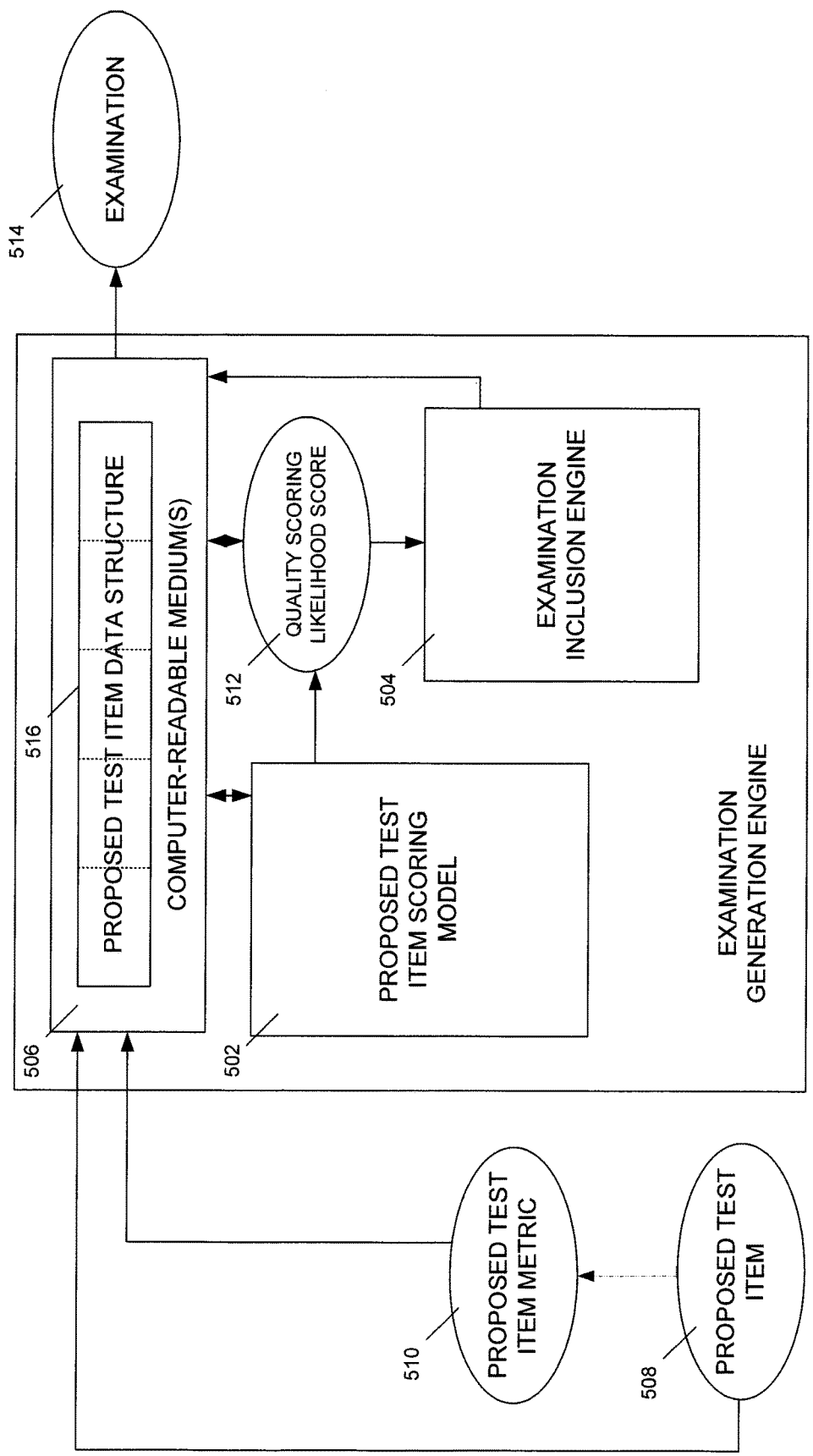
FIG. 5 is a block diagram of a computer-implemented system for selecting a proposed test item for inclusion in an examination where a non-multiple choice response to the proposed test item will be automatically scored.

FIG. 5 is a block diagram of a computer-implemented system for selecting a proposed test item for inclusion in an examination where a non-multiple choice response to the proposed test item will be automatically scored. The system includes one or more data processors that implement a proposed test item scoring model 502 and an examination inclusion engine 504. The system further includes one or more computer-readable mediums 506. The one or more computer-readable mediums include a proposed test item 508, where the proposed test item is a non-multiple choice test item. The one or more computer-readable mediums further include instructions for commanding the one or more data processors to analyze the proposed test item 508 to generate a proposed test item metric 510 that is stored in one the one or more computer-readable mediums. The instructions further command that the proposed test item scoring model 502 be used to determine a likelihood score 512 indicative of a likelihood that automated scoring of a response to the proposed test item 508 would be at or above a quality level. The instructions further command that the proposed test item 508 be selected for inclusion in the examination 514 based on the likelihood score 512.

In one example, the one or more computer-readable mediums 506 further include a proposed test item data structure 516. The proposed test item data structure 516 includes a number of records, with, in one example, one record being associated with each proposed test item 508. The records include a number of fields associated with the respective proposed test item. Example fields include an identifier for the proposed test item, the proposed test item metric, and an indicator of whether the proposed test item is selected for inclusion in the examination 514.

Figure 6:
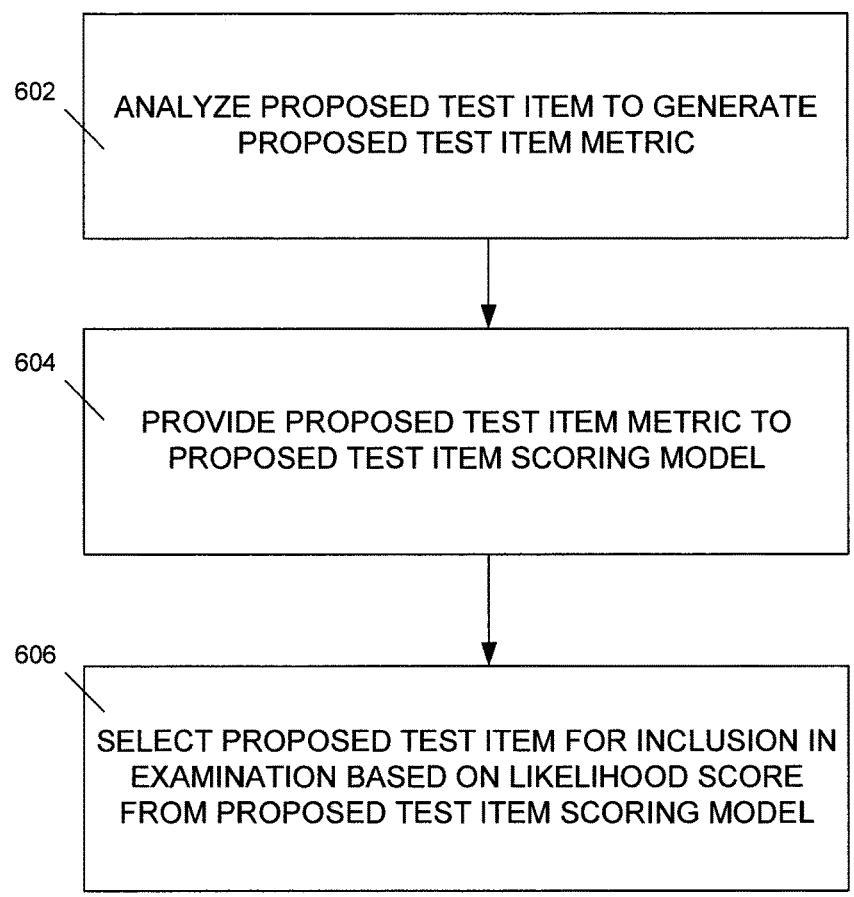
FIG. 6 is a flow diagram depicting a computer-implemented method of selecting a proposed test item for inclusion in an examination where a non-multiple choice response to the proposed test item will be automatically scored.

FIG. 6 is a flow diagram depicting a computer-implemented method of selecting a proposed test item for inclusion in an examination where a non-multiple choice response to the proposed test item will be automatically scored. At 602, a proposed test item is analyzed to generate a proposed test item metric, where the proposed test item is a non-multiple choice test item. The proposed test item metric is provided, at 604, to a proposed test item scoring model, where the proposed test item scoring model outputs a likelihood score indicative of a likelihood that automated scoring of a response to the proposed test item would be at or above a quality level. At 606, the proposed test item is selected for inclusion in the examination based on the likelihood score.

Figure 7:
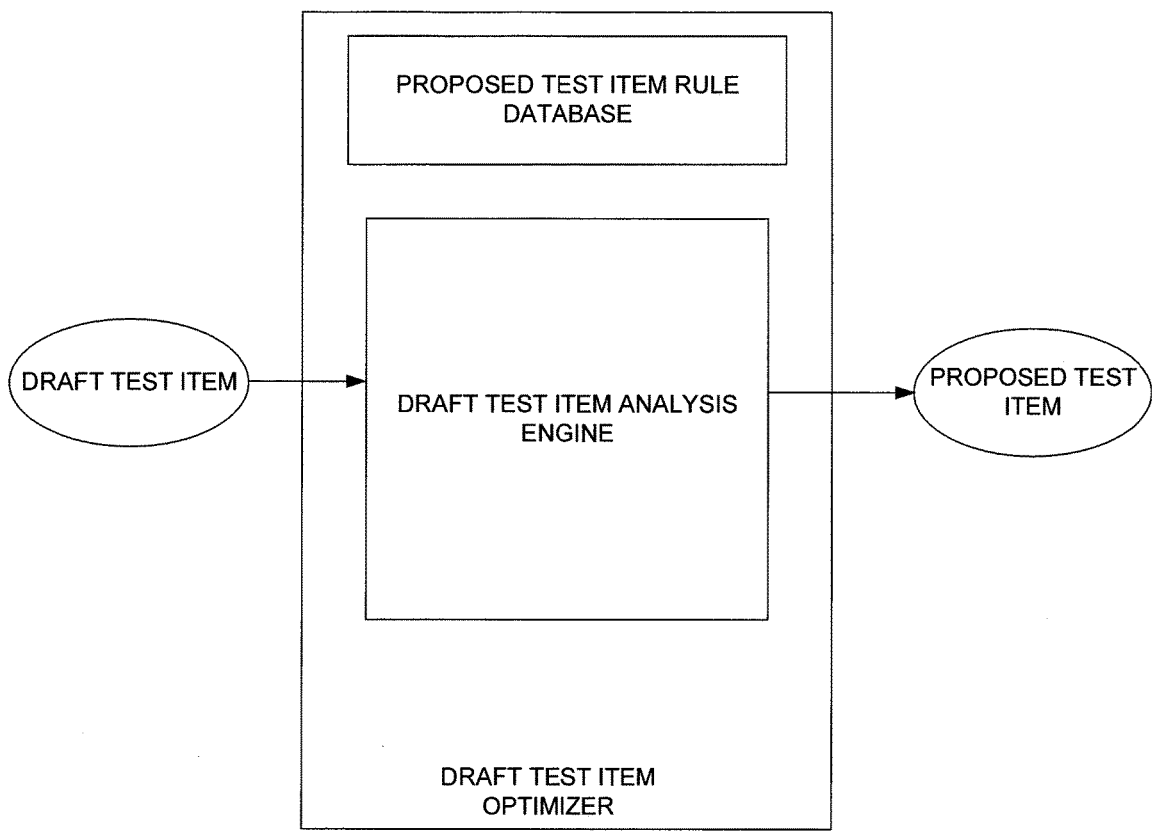
FIG. 7 is a block diagram depicting a draft test item optimizer that is configured to improve the automatic scorability of draft test items.

In addition to use in performing estimations of likelihoods that responses to a particular proposed test item will be scored satisfactorily by an automatic scoring model, the knowledge of what characteristics of a proposed test item make that proposed test item more likely to be automatically scored well can be used in the development of proposed test items. FIG. 7 is a block diagram depicting a draft test item optimizer that is configured to improve the automatic scorability of draft test items. A draft test item optimizer 702 receives a draft test item 704 and provides the draft test item 704 to a draft test item analysis engine 706. The draft test item analysis engine 706 processes the draft test item 704 in the context of a set of proposed test item rules from a proposed test item rule database 708 to determine whether the draft test item 704 is in good condition for proposal as a proposed test item 710. If the draft test item analysis engine 706 deems the draft test item 704 in good condition, the proposed test item 710 may be output in unchanged form. However, if the proposed test item rules 708 indicate a weakness in the draft test item 704, then that weakness is addressed. For example, if the draft test item optimizer 702 is implemented as part of a test item authoring tool, then an indication of the weakness may be supplied to a test item author via a graphical interface, providing the author an opportunity to adjust the draft test item 704 to address the weakness or to decline to change the draft test item 704. In another example, the draft test item optimizer 702 may be implemented as part of an automated optimization engine, where the draft test item 704 is automatically adjusted to address the identified weakness.

The proposed test item rules may take a variety of forms. For example, one type of rule may address the use of pronouns in draft test item prompts 704 or scoring keys. The rules may indicate that all pronouns should be flagged as potential weaknesses. In another example, the rules may further analyze the draft test item 704 to determine whether the pronoun usage is potentially ambiguous. Another proposed test item rule may flag concepts in a scoring key that are potentially vague (e.g., suggesting a change from "a bit less than 90" to "less than 90" where appropriate). Other rules may identify prompts or key concepts that include too many dependent clauses, suggesting a reduction to fewer dependent clauses. A further rule may identify scenarios where key concepts may include some overlap in scope, suggesting combining or otherwise adjusting those key concepts.

Figure 8A:
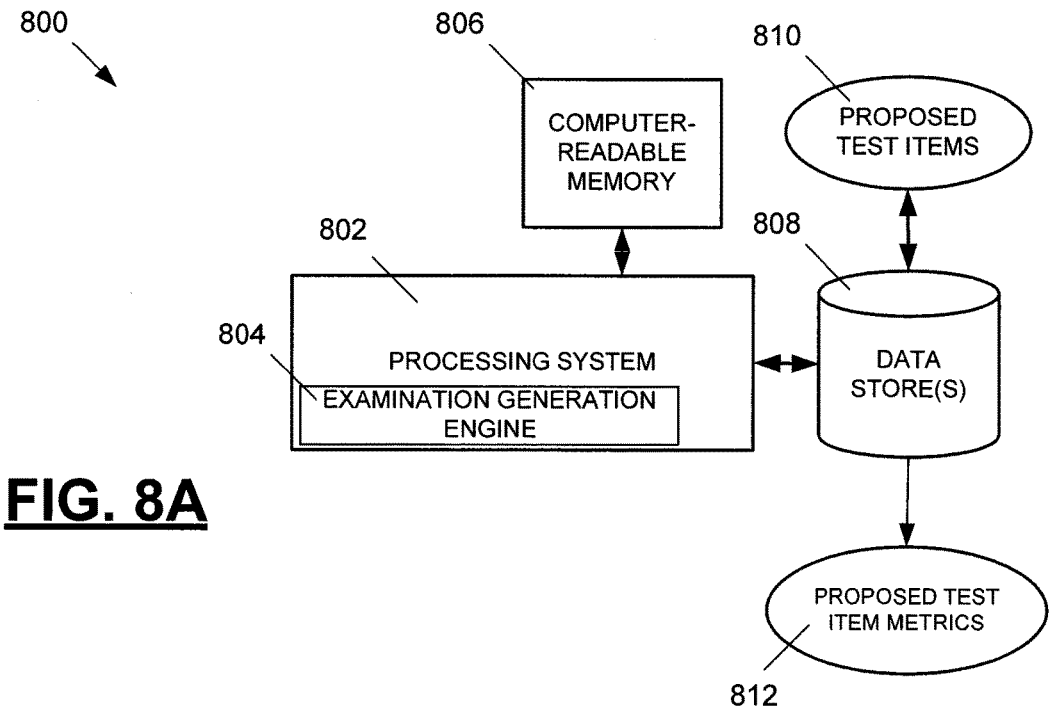
FIGS. 8A, 8B, and 8C depict example systems for use in implementing an examination generation engine.
Figure 8B:
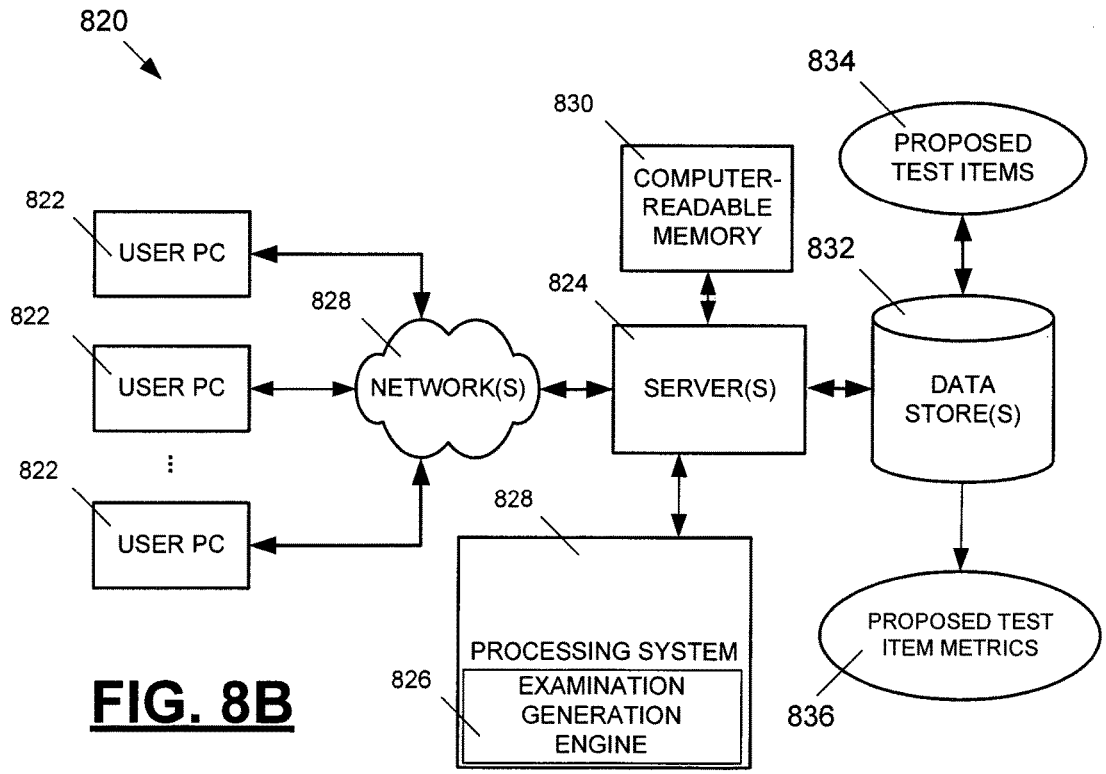
Figure 8C:
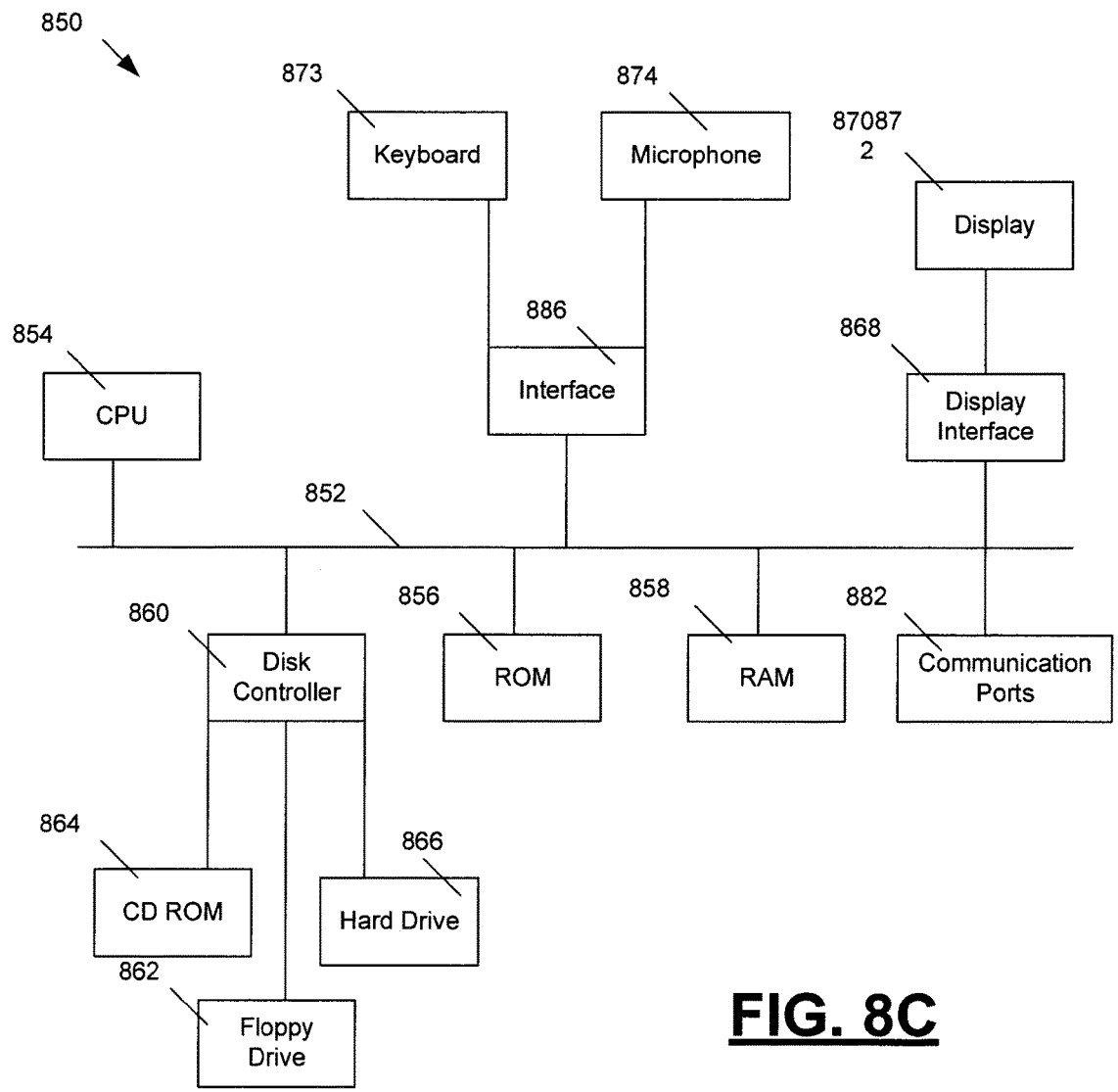

Examples have been used to describe the invention herein, and the scope of the invention may include other examples. FIGS. 8A, 8B, and 8C depict example systems for use in implementing an examination generation engine. For example, FIG. 8A depicts an exemplary system 800 that includes a standalone computer architecture where a processing system 802 (e.g., one or more computer processors located in a given computer or in multiple computers that may be separate and distinct from one another) includes an examination generation engine 804 being executed on it. The processing system 802 has access to a computer-readable memory 806 in addition to one or more data stores 808. The one or more data stores 808 may include proposed test items 810 as well as proposed test item metrics 812.

FIG. 8B depicts a system 820 that includes a client server architecture. One or more user PCs 822 access one or more servers 824 running an examination generation engine 826 on a processing system 828 via one or more networks 828. The one or more servers 824 may access a computer readable memory 830 as well as one or more data stores 832. The one or more data stores 832 may contain proposed test items 834 as well as proposed test item metrics 836.

FIG. 8C shows a block diagram of exemplary hardware for a standalone computer architecture 850, such as the architecture depicted in FIG. 8A that may be used to contain and/or implement the program instructions of system embodiments of the present invention. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 856 and random access memory (RAM) 858, may be in communication with the processing system 854 and may contain one or more programming instructions for performing the method of implementing an examination generation engine. Optionally, program instructions may be stored on a non-transitory computer readable storage medium such as a magnetic disk, optical disk, recordable memory device, flash memory, or other physical storage medium.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of selecting a proposed test item for inclusion in an examination where a non-multiple choice, not-true-false response to the proposed test item will be automatically scored, comprising:

analyzing, using a processing system, a proposed test item to generate a proposed test item metric, wherein the proposed test item is a non-multiple choice, non-true-false test item that calls for a constructed response;

applying automated computer scoring of a statistical computer scoring model to a human-scored constructed response for the proposed test item to generate an automated score for the constructed response, the automated computer scoring based on a regression analysis that utilizes multiple weighted features whose feature weights are determined by training the statistical computer scoring model relative to a plurality of training items;

applying the statistical computer scoring model to the proposed test item metric, the automated score generated by the automated computer scoring of the constructed response, and a human score generated by human scoring of the constructed response, wherein the statistical computer scoring model generates, based on the proposed test item metric, a likelihood score indicative of a likelihood that automated scoring of a response to the proposed test item would be at or above a quality level, the statistical computer scoring model assessing whether the proposed test item is amenable to automated scoring via comparison to the human scoring;

selecting, using the processing system, the proposed test item for inclusion in the examination based on the likelihood score.

2. The method of claim 1, wherein the proposed test item metric is a human scoring agreement metric.

3. The method of claim 2, wherein the human scoring agreement metric is based on of a level of agreement between two human scorers scoring an identical response to the proposed test item.

4. The method of claim 2, wherein the human scoring agreement metric is generated by:

providing a plurality of responses to the proposed test item to a first human scorer for generation of a plurality of first scores;

providing the plurality of responses to the proposed test item to a second human scorer for generation of a plurality of second scores;

computing magnitudes of differences between corresponding first scores and second scores; and determining the human scoring agreement metric based on the computed magnitudes of differences.

5. The method of claim 1, wherein the proposed test item metric is based on a number of training responses used to train and test an automated scoring model configured to automatically score responses to the proposed test item.

6. The method of claim 5, wherein the proposed test item metric is one or more of a number of training responses used to train the automated scoring model, a number of training responses used to validate the automated scoring model, and a number of training responses used to test the automated scoring model.

7. The method of claim 1, wherein the proposed test item metric is based on a characteristic of the proposed test item.

8. The method of claim 7, wherein the proposed test item metric is a maximum score attainable for the proposed test item or a number of concepts associated with the proposed test item.

9. The method of claim 1, wherein the proposed test item metric is based on a difficulty of the proposed test item.

10. The method of claim 1, wherein analyzing the proposed test item further comprises:

analyzing a plurality of responses to the proposed test item, wherein the proposed test item metric is based on a characteristic of the plurality of responses.

11. The method of claim 1, wherein the proposed test item metric is based on a key that lists concepts to be considered in scoring responses to the proposed test item, wherein the characteristic is a: word count, a mean word length, a mean word frequency, a content word count, an average content word frequency, a syntactic constituent maximal depth in a parse tree, a maximal separation of arguments and predicates, a dependent clause count, or a maximal level of embedding of dependent clauses.

12. The method of claim 1, wherein selected proposed test items are included in a test item bank, wherein test items are selected from the test item bank for presentation during particular instances of the examination.

13. A computer-implemented system for selecting a proposed test item for inclusion in an examination where a non-multiple choice, non-true-false response to the proposed test item will be automatically scored, comprising:

one or more data processors; and one or more non-transitory computer-readable mediums comprising instructions for commanding the one or more data processors to:

analyze a proposed test item to generate a proposed test item metric, wherein the proposed test item is a non-multiple choice, non-true-false test item that calls for a constructed response;

apply automated computer scoring of a statistical computer scoring model to a human-scored constructed response for the proposed test item to generate an automated score for the constructed response, the automated computer scoring based on a regression analysis that utilizes multiple weighted features whose feature weights are determined by training the statistical computer scoring model relative to a plurality of training items;

apply the statistical computer scoring model to the proposed test item metric, the automated score generated by the automated computer scoring of the constructed response, and a human score generated by human scoring of the constructed response, the statistical computer scoring model generating, based on the proposed test item metric, a likelihood score indicative of a likelihood that automated scoring of a response to the proposed test item would be at or above a quality level, the statistical computer scoring model assessing whether the proposed test item is amenable to automated scoring via comparison to the human scoring; and select the proposed test item for inclusion in the examination based on the likelihood score.

14. The system of claim 13, wherein the one or more non-transitory computer-readable mediums further include a proposed test item data structure, wherein the proposed test item data structure includes fields, wherein the fields include:
an identifier for the proposed test item;
the proposed test item metric; and
an indicator of whether the proposed test item is selected for inclusion.

15. The system of claim 14, wherein the fields include characteristics of a set of responses to the proposed test item, wherein the characteristic is a: word count, a mean word length, a mean word frequency, a content word count, an average content word frequency, a syntactic constituent maximal depth in a parse tree, a maximal separation of arguments and predicates, a dependent clause count, or a maximal level of embedding of dependent clauses.

16. The system of claim 13, wherein the proposed test item metric is a human scoring agreement metric based on a level of agreement between two human scorers scoring an identical response to the proposed test item.

17. The system of claim 16, wherein the instructions further command the one or more data processors to:
provide a plurality of responses to the proposed test item to a first human scorer for generation of a plurality of first scores;
provide the plurality of responses to the proposed test item to a second human scorer for generation of a plurality of second scores;
compute magnitudes of differences between corresponding first scores and second scores; and
determine the human scoring agreement metric based on the computed magnitudes of differences.

18. The system of claim 13, wherein the proposed test item metric is based on a number of training responses used to train an automated scoring model configured to automatically score responses to the proposed test item.

19. The system of claim 18, wherein the proposed test item metric is one or more of a number of training responses used to train the automated scoring model, a number of training responses used to validate the automated scoring model, and a number of training responses used to test the automated scoring model.

20. The system of claim 13, wherein the proposed test item metric is a maximum score attainable for the proposed test item or a number of concepts associated with the proposed test item.

* * * * *